May 29, 1962   R. H. DICKE   3,036,465
GRAVITY METER
Filed Nov. 25, 1957
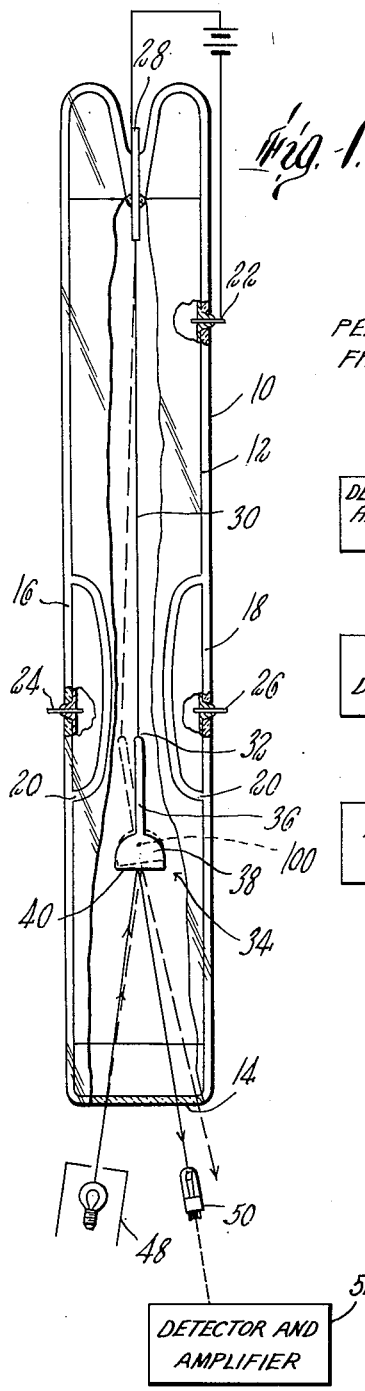
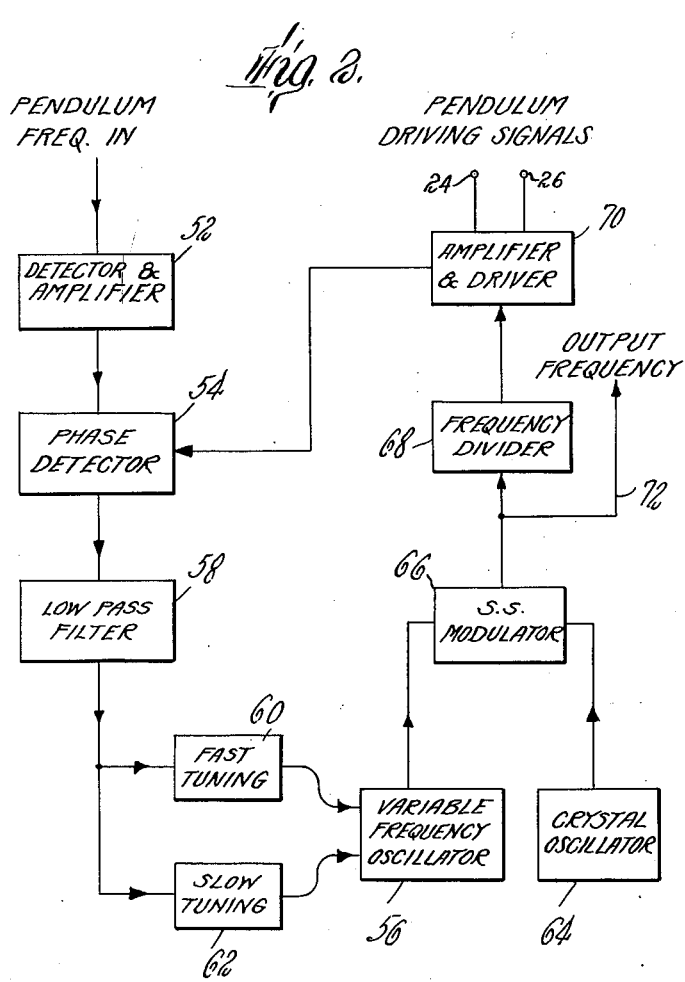
INVENTOR.
Robert H. Dicke
BY Robert S. Toperzer
ATTY.

3,036,465
GRAVITY METER
Robert H. Dicke, 37 Jefferson Road, Princeton, N.J.
Filed Nov. 25, 1957, Ser. No. 698,697
9 Claims. (Cl. 73—382)

This invention relates to a gravity meter of the pendulum type and pertains more specifically to a pendulum gravimeter having a high oscillation frequency, of the order of twenty cycles per second or more.

Conventional geodetic pendulums employed for determining the acceleration of gravity are deficient in that they have a low frequency of oscillation, with the result that they have a tendency to be disturbed by microseisms and other vibrations. In addition, long periods of observation are required in the case of such pendulums in order to make a determination of the acceleration of gravity with a high degree of accuracy.

I have found that by providing a pendulum pivot which is not fixed but which is free to move in reciprocating fashion along a generally horizontal line, it is possible to overcome the disadvantages of conventional geodetic pendulums and attain the desired high oscillation frequency. In practice, the pivot may be supported for movement in an arcuate path provided the pendulum length is less than the radius of curvature of the path.

Accordingly, one object of the present invention is to provide a pendulum gravimeter having a high frequency of oscillation, of the order of twenty cycles per second or higher.

A second object is to provide a pendulum gravimeter having a high Q of the order of $10^6$ or greater.

Another object is to provide a pendulum gravimeter capable of supplying substantially continuously accurate information as to the acceleration of gravity.

Still a further object is to provide a pendulum gravimeter which is relatively free from drift and which can readily be fabricated in a form which is insensitive to temperature changes.

Other and further objects will be apparent from the drawing and from the description thereof which follows.

In the drawings:

FIG. 1 is a view in cross-section of an embodiment of the present invention; and FIG. 2 is a schematic drawing showing a suitable circuit for maintaining the pendulum in oscillation.

As shown in the drawing, the device includes a hermetically sealed tubular container 10 of glass, quartz or other suitable material from which the air has been evacuated to a pressure of $10^{-4}$ millimeters of mercury or less. The inner face of the wall of container 10 is provided with an electroconductive coating 12 such as a coating of silver, aluminum or other metal. The lower end 14 of container 10 is left uncoated to permit it to transmit light rays. A pair of electrodes 16, 18 are provided at opposite sides of container 10 in the form of localized zones of electroconductive coating material spaced from the remainder of coating 12 by a narrow ribbon of uncoated glass or quartz 20, 20. Leads 22, 24, 26 are fused into the wall of container 10 and are connected electrically to coating 12 and electrodes 16, 18 respectively.

At the upper end of container 10 a fourth lead 28 insulated from coating 12 is fused into the wall of container 10 and serves as an abutment from which a tension member comprising a quartz fiber 30 is suspended, the quartz fiber being free to swing from abutment 28. The lower or free end 32 of quartz fiber 30 supports the pendulum 34 for oscillating movement, the pendulum being free to oscillate about this point as a pivot. Pendulum 34 includes a relatively rigid stem of quartz or glass 36 fixed to a bob 38 consisting of a mass of quartz or glass having a polished light reflective lower face 40. All of fiber 30, stem 36, and bob 38 are provided with an electroconductive coating such as silver or aluminum except for reflecting face 40, the coating being electrically connected to lead 28.

While the dimensions of the various parts of the construction may obviously vary over a wide range, the quartz fiber which serves as a tension member may suitably be approximately 10 cm. long and 0.01 mm. in diameter, while stem 36 may be approximately 1 cm. in length and 1 mm. in diameter, and bob 38 may be approximately 7 mm. in diameter. Also, a rigid link may be suitably employed in place of the fiber 30, the link being pivotally connected at its upper end to abutment 28 and at its lower end to stem 36 by means of precision bearings for example.

The pendulum is maintained in operation by a periodically varying electrostatic field, which is produced by the electrodes 16, 18, and which acts upon charges applied to the pendulum and the support wire by way of terminals 22 and 28. Suitable driving signals to obtain the action may be derived in accordance with the system illustrated in FIG. 2. Thus, signals whose frequency corresponds to the oscillating frequency of the pendulum are applied to an amplifier 52 and then to a phase detector 54 for phase comparison with the driving signals themselves. Any phase difference that may exist is reflected in the amplitude of a direct current signal produced by the phase detector and applied as a control signal to control the frequency of a variable frequency oscillator 56. First, however, this frequency control signal is transmitted through a low pass filter 58 to eliminate undesired input frequency components, the actual frequency control function being carried out by means of the combined action of a fast tuning control 60 and a slow tuning control 62. In the fast tuning control suitable differentiating operations are performed on the signal, and in the slow tuning control the signal is integrated so as to optimize the mode of control of oscillator 56 in accordance with conventional servo-principles.

The signal from oscillator 56, which preferably will be in the neighborhood of several hundred cycles is utilized to modulate the output of a master oscillator 64 which is crystal controlled. Modulation takes place in a single side band modulator 66 whereby a single frequency signal is produced representing either the sum or difference frequencies of oscillators 64 and 56. By means of a frequency divider 68, the signal is then converted to the pendulum control frequency, and by means of a suitable amplifier and driver unit 70 a signal suitable for driving the pendulum at this frequency is developed. This driving signal may have a sinusoidal or other waveform, but a pulse type waveform is preferred in which case it will be understood that the driver 70 will incorporate suitable wave shaping circuitry or alternatively a synchronized pulse generator. Also a double ended output circuit from the driver 70 is preferred for connection to the electrode terminals 24, 26 with the shield terminal 22 being connected to ground and with the pendulum terminal 28 having a fixed D.C. bias voltage applied thereto. The latter may be obtained from any convenient source since the stability and harmonic content of the source voltage will not be critical factors. A single ended output may also be used in which case terminals 22 and 28 may be connected in common with one of the electrode terminals.

According to this system, the pendulum driving pulses are effectively phase-locked to the natural pendulum frequency so that the driving pulses themselves, or the signals from which they are derived, may be employed as an output from the system to indicate the pendulum frequency. A most convenient point for deriving such an output frequency is at the output side of the modulator 66, as indicated by the line 72. An alternative arrangement would be to have the variable frequency oscillator drive the pendulum directly, thereby eliminating the need for the crystal oscillator, the single side band modulator, and the frequency divider. An output signal could be obtained from either of the amplifiers 70 or 52, but preferably the latter where uncontrolled variations in the frequency of oscillator 56 would have a second order effect only on the output frequency. In the absence of the short time stabilizing effect of the crystal oscillator 64, a much more highly stable oscillator 56 will be required, however.

An illustration of how suitable input pulses may be obtained from the pendulum is provided in FIG. 1. Thus, collimated light from a source 48 is directed toward the reflective surface 40 of the pendulum and the reflection thereof is detected by a photoelectric cell 50. Preferably, means such as knife edge are provided effectively to enhance the directive qualities of the photocell so that the same will be energized only for a very brief interval during each cycle of oscillation of the pendulum.

The operation of the pendulum may thus be summarized as follows. Driving signals from the system of FIG. 2 cause pendulum 34 to oscillate about pivot point 32 at its natural frequency. However, pivot 32 is not fixed laterally, but is free to swing the tension member or fiber 30 back and forth. Accordingly, as indicated in FIG. 1, the center of gyration 100 of pendulum 34 does not move laterally, but only vertically, while pivot 32 moves laterally in a substantially horizontal line. Although the true path followed by pivot 32 as it reciprocates is arcuate, it may be considered a straight line for all practical purposes when the amplitude of the swinging movement of the lower end of fiber 30 is less than one-tenth of the length of the fiber. When the amplitude is also less than one-tenth of the length of the stem 36, the natural frequency of oscillation of pendulum 34 is given approximately by the equation:

$$\gamma = 1/2\pi \sqrt{\frac{gl}{r^2}}$$

where $l$ equals the distance from abutment 28 to the center of mass of pendulum 34, $g$ is the acceleration of gravity and $r$ is the radius of gyration of the pendulum. Inasmuch as $r$ can be made very small as compared with $l$, the frequency of oscillation of the pendulum can be made much higher than that of a conventional pendulum and preferably is of the order of twenty cycles per second or higher.

Various modifications of the illustrative embodiment described in the foregoing that are within the spirit and scope of the invention will no doubt occur to those skilled in the art and therefore the invention should not be deemed to be limited to the specific details of what has been described by way of illustration, but rather it should be deemed to be limited only by the scope of the appended claims.

What is claimed is:

1. A gravity meter comprising a pendulum, an element pivotally connected to said pendulum, means to support said element for horizontal movement of the pivot point of connection, means for maintaining said pendulum in oscillation at its natural frequency with its pivot point of connection moving in a substantially horizontal line and its center of gyration moving in a substantially vertical line, and means for measuring said frequency.

2. A gravity meter comprising a pendulum, a link pivotally connected to said pendulum, a fixed support for pivotal suspension of said link, means for maintaining said pendulum in oscillation at its natural frequency with its pivot point of connection moving in a substantially horizontal line and its center of gyration moving in a substantially vertical line, and means for measuring said frequency.

3. A gravity meter comprising an elongated rigid pendulum having a low center of mass and having a pivot point, a filamentary element attached to said pivot point, a fixed support from which said element is suspended, means for maintaining said pendulum in oscillation at its natural frequency with its pivot point of connection moving in a substantially horizontal line and its center of gyration moving in a substantially vertical line, and means for measuring said frequency.

4. A gravity meter comprising a motion system including a pendulum and an element pivotally connected to said pendulum, means to support said element for horizontal movement of the pivot point of connection, means to apply an electrical charge to said motion system, means to produce a periodically varying electrostatic field, said motion system being disposed within said field and said field being horizontally directed to impart to said system horizontal components of motion which maintain said pendulum in oscillation with its pivot point of connection moving in a substantially horizontal line and its center of gyration moving in a substantially vertical line, means to determine the pendulum frequency, and means to control the frequency of said field in accordance with said determined pendulum frequency.

5. A gravity meter comprising a pendulum, an elongated element pivotally connected to said pendulum, means to support said element for horizontal movement of the pivot point of connection, means to apply a charge to said element, a pair of horizontally spaced electrodes, said element being disposed between said electrodes, means to produce a driving signal of periodically varying amplitude, said signal being applied to said electrodes to produce a periodically varying electrostatic field acting upon said element to impart horizontal components of motion to it and maintain said pendulum in oscillation with its pivot point of connection moving in a substantially horizontal line and its center of gyration moving in a substantially vertical line, means to produce a pendulum frequency output signal, means to determine the phase relation between said driving signal and said output signal, and means to control the frequency of the driving signal in accordance with deviations from a predetermined phase relation.

6. A gravity meter comprising a pendulum, an elongated element pivotally connected to said pendulum, means to support said element for horizontal movement of the pivot point of connection, means to apply a charge to said element, a crystal oscillator, a variable frequency oscillator to produce a signal of substantially lower frequency than the crystal oscillator signal, means to combine said oscillator signals and to produce an output signal whose frequency differs from that of said crystal oscillator signal by an amount equal to the frequency of said variable frequency oscillator signal, means to derive a signal which is a subharmonic of said output signal, a pair of horizontally spaced electrodes, said element being disposed between said electrodes, said subharmonic signal being applied to said electrodes to produce a periodically varying electrostatic field acting upon said element to impart horizontal components of motion to it and maintain said pendulum in oscillation with its pivot point of connection moving in a substantially horizontal line and its center of gyration moving in a substantially vertical line, means to produce a pendulum frequency output signal, means to determine the phase relation between said subharmonic signal and said pendulum output signal, and means to control the frequency of said variable frequency oscillator in accordance with said phase relation.

7. A gravity meter comprising a pendulum having a pivot point, a link to pivotally suspend said pendulum from said pivot point, a fixed support for pivotal suspension of said link, means for maintaining an electrical charge on said link, a pair of horizontally spaced electrodes, said link being disposed between said electrodes, means to produce a driving signal of periodically varying amplitude, said signal being applied to said electrodes to produce a periodically varying electrostatic field acting upon said link to impart horizontal components of motion to it and maintain said pendulum in oscillation with its pivot point of connection moving in a substantially horizontal line and its center of gyration moving in a substantially vertical line, means to produce a pendulum frequency output signal, means to determine the phase relation between said driving signal and said output signal, and means to control the frequency of the driving signal in accordance with deviations from a predetermined phase relation.

8. In a gravity meter including an electrically charged pendulum system, the combination of a pair of horizontally spaced electrodes, said pendulum system being disposed between said electrodes, means to produce a driving signal of periodically varying amplitude, said signal being applied to said electrodes to produce a periodically varying electrostatic field acting upon said pendulum system to impart horizontal components of motion to it and maintain it in oscillation with its pivot point of connection moving in a substantially horizontal line and its center of gyration moving in a substantially vertical line, means to produce a pendulum frequency output signal, means to determine the phase relation between said driving signal and said output signal, and means to control the frequency of the driving signal in accordance with deviations from a predetermined phase relation.

9. In a gravity meter including an electrically charged pendulum system, the combination of a crystal oscillator, a variable frequency oscillator to produce a signal of substantially lower frequency than the crystal oscillator signal, means to combine said oscillator signals and to produce an output signal whose frequency differs from that of said crystal oscillator signal by an amount equal to the frequency of said variable frequency oscillator signal, means to derive a signal which is a subharmonic of said output signal, a pair of horizontally spaced electrodes, said pendulum system being disposed between said electrodes, said subharmonic signal being applied to said electrodes to produce a periodically varying electrostatic field acting upon said pendulum system to impart horizontal components of motion to it and maintain pendulum oscillation with its pivot point of connection moving in a substantially horizontal line and its center of gyration moving in a substantially vertical line, means to produce a pendulum frequency output signal, means to determine the phase relation between said subharmonic signal and said pendulum output signal, and means to control the frequency of said variable frequency oscillator in accordance with said phase relation.

References Cited in the file of this patent

UNITED STATES PATENTS

| | | |
|---|---|---|
| 1,543,124 | Ricker | June 23, 1925 |
| 2,178,252 | Forster | Oct. 31, 1939 |
| 2,657,581 | Fay et al. | Nov. 3, 1953 |